United States Patent [19]

Lancaster et al.

[11] Patent Number: 4,657,726

[45] Date of Patent: Apr. 14, 1987

[54] MODERATOR CONTROL APPARATUS FOR A NUCLEAR REACTOR FUEL ASSEMBLY

[75] Inventors: Dale B. Lancaster, Monroeville; Edmund E. DeMario, Penn Hills, both of Pa.

[73] Assignee: Westinghouse Electric Corp., Pittsburgh, Pa.

[21] Appl. No.: 623,744

[22] Filed: Jun. 22, 1984

[51] Int. Cl.[4] ............................................. G21C 7/26
[52] U.S. Cl. ................................ 376/209; 376/221; 376/331; 376/328; 137/625.11; 137/625.47
[58] Field of Search .................................. 376/327–329, 376/221, 209, 331; 137/625.11, 625.47, 625.46

[56] References Cited

U.S. PATENT DOCUMENTS

| | | | |
|---|---|---|---|
| 3,206,926 | 9/1965 | Lockwood | 137/625.11 |
| 3,219,536 | 11/1965 | Butler et al. | 137/625.11 |
| 3,508,582 | 4/1970 | Aulisa | 137/625.11 |
| 3,624,241 | 11/1971 | Power | 376/328 |
| 3,629,059 | 12/1971 | Agazzi et al. | 376/331 |
| 3,629,068 | 12/1971 | Lantz et al. | 376/331 |
| 3,652,394 | 3/1972 | Braun | 376/327 |
| 4,058,960 | 11/1977 | Movshovich et al. | 137/625.11 |

FOREIGN PATENT DOCUMENTS

| | | |
|---|---|---|
| 2159196 | 6/1973 | Fed. Rep. of Germany ...... 376/328 |
| 2434226 | 2/1976 | Fed. Rep. of Germany ...... 376/328 |
| 916324 | 1/1963 | United Kingdom ................ 376/221 |
| 954101 | 4/1964 | United Kingdom ................ 376/221 |
| 1029712 | 5/1966 | United Kingdom ................ 376/328 |
| 1112346 | 6/1968 | United Kingdom . |
| 1233832 | 6/1971 | United Kingdom . |
| 1358984 | 7/1974 | United Kingdom . |
| 1511494 | 5/1978 | United Kingdom . |

Primary Examiner—Harvey E. Behrend

[57] ABSTRACT

A moderator control apparatus is provided for use with a fuel assembly to improve fuel utilization in thereby reducing fuel cycle costs. The apparatus includes a plurality of displacer rods filled with a burnable poison gas which are inserted into the guide thimbles of the fuel assembly to displace a portion of the coolant in thus reducing the H/U ratio at the start of the cycle. The displacer rods are connected at their upper ends to a manifold which has a central opening with a plurality of inlet ports disposed about the central opening and in fluid flow communication with the rods. A rotatable valve is disposed in the central opening and operable to selectively open and close the inlet ports so as to either permit or obstruct the flow of coolant into the displacer rods in a predetermined controlled manner. During operation of the fuel cycle, the inlet ports are progressively opened in a sequential pattern to slowly release the poison gas from the rods and, at the same time, remove the displacement by filling the rods with the coolant in thus shifting the energy spectrum back to its normal H/U ratio.

12 Claims, 4 Drawing Figures

MODERATOR CONTROL APPARATUS FOR A NUCLEAR REACTOR FUEL ASSEMBLY

CROSS REFERENCE TO RELATED APPLICATIONS

Reference is hereby made to the following copending applications dealing with related subject matter and assigned to the assignee of the present invention.

1. "An Improved Water Displacer Rod Spider Assembly For a Nuclear Reactor Fuel Assembly" by Trevor A. Francis; U.S. Ser. No. 595,154; filed Mar. 30, 1984.

2. "Control Rod For Nuclear Reactor" by Trevor A. Francis and John F. Wilson; U.S. Ser. No. 556,576; filed Nov. 30, 1983.

BACKGROUND OF THE INVENTION

The present invention relates generally to nuclear reactors, and more particularly is directed to an apparatus used with a fuel assembly for controlling the nuclear reactivity by varying the volume of the moderator/coolant associated with the fuel rods of the assembly and, at the same time, adding a burnable poision gas in thereby improving the fuel utilization, thus allowing for lower fuel enrichments.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. Conventional designs of these fuel assemblies include a plurality of fuel rods and hollow tubes or guide thimbles held in an organized array by grids spaced along the fuel assembly length and attached to the guide thimbles. The guide thimbles are structural members which also provide channels for neutron absorber rods, burnable poison rods or neutron source assemblies which are all vehicles for controlling the reactivity of the reactor. Top and bottom nozzles on opposite ends thereof are secured to the guide thimbles in thereby forming an integral fuel assembly. Generally, in most reactors, a moderator/coolant such as water, is directed upwardly through aperatures in the lower core support plate and along the various fuel assemblies to receive the thermal energy therefrom. An example of such a fuel assembly structure can be seen in U.S. Pat. No. 4,326,419; granted to Donald J. Hill.

Since the nuclear industry's inception, core component design improvements have evolved in response to changes in regulatory requirements, manufacturing considerations, and power generation costs. Increasingly, utilities and fuel suppliers have focused ever more strongly on neutron economy and reduced power generation costs. These effects have been motivated by increased fuel and fuel enrichment costs. In response to these demands, designers have been working hard in developing new designs and in modifying existing designs to improve fuel utilization, as well as, in increasing safety margins in reactors.

It is known that improved fuel economy can be achieved in a PWR (Pressurized Water Reactor) by initially operating with a reduced H/U (hydrogen/uranium) ratio and then returning the ratio to normal somewhat later in the core cycle. The initial H/U reduction has the effect of increasing the epithermal part of the neutron spectrum at the expense of the thermal part. This results in increased breeding and decreased fission and fuel depletion rates. Since reactor fuel starts off with excess reactivity, this spectral shift represents no problem early in the core life; however, if the decrease in H/U were maintained through the entire core cycle, nothing would be gained because the higher fertile material absorption and lower fission rate would more than balance the gains from the increased breeding and lower burnup. Consequently, in order to properly take advantage of the increased breeding and lower burnup, it is necessary to return the H/U ratio back to its normal value. The net result would allow a reactor to be operated for a full core cycle with a reduced initial uranium enrichment. One of the ways of altering the H/U ratio which has been investigated involves the use of displacer rods. As the name implies, these rods are placed in the core to initially displace some of the moderating water and decrease the H/U ratio, and then, at some point during the core cycle, the displacement associated with these rods would be removed.

One approach considered for removing this displacement is through the use of movable mechanisms, similar to those associated with control rods. Such an approach is described in the above cross-referenced copending application of Trevor A. Francis, entitled "An Improved Water Displacer Rod Spider Assembly For A Nuclear Reactor Fuel Assembly". Among other unfavorable conditions, movable control mechanisms are expensive.

Another approach contemplated for removing the displacement is to have membranes provided on the ends of the displacer rods which are penetrated at some point in time to allow the rods to be filled with water. The basic idea makes use of a small heating element surrounding a specially indented end cap on the hollow displacer rod. At an appropriate time, the heater is turned on and the indented part of the end cap is weakened to the point where the external water pressure opens the end cap and fills the rod with water. The basic idea was expanded to include a manifold for each fuel assembly which would be constructed very similar to the spider-like control rod clusters presently used in reactors. All the rods in the cluster would be controlled by a single end-cap in the cluster head. The end-cap on each cluster would have an external plug connected to the heater inside. The procedure for changing the H/U ratio during a reactor cycle would be as follows: first, the reactor would be reduced to lower power or placed in a hot shut-down condition; the heaters in all the displacer rod clusters would be activated through heater power cables until all the end-caps have blown; and then, the reactor would be started up again. With the increased reactivity resulting from the higher H/U ratio, an elevated concentration of boron shim would have to be reintroduced into the primary coolant. Some of the problems anticipated with such an approach would be the reliability of the connectors and wiring when exposed to the pressure and corrosive capabilities of the reactor water, the potential failure of the rods themselves, what to do with the burst displacer rods after use since they are contaminated and thus inconvenient and impractical to transport and/or discard, and lastly, there is concern as to what would happen to such a displacer rod system in the case of LOCA (Loss of Coolant Activity) or other reactor problems.

The present inventors were aware of the teachings of the above described works and their shortcomings when they developed their alternative approach which is the subject of the present invention.

SUMMARY OF THE INVENTION

The present invention provides a moderator control apparatus for a nuclear reactor fuel assembly so as to improve fuel utilization and thereby reduce fuel cycle costs. The apparatus is designed to displace a portion of the moderator/coolant for a reduced H/U ratio at initial start-up and then later, on a gradual basis, remove the displacement in shifting the energy spectrum by returning the H/U ratio to normal. The displacer rods are initially filled with a gaseous burnable poison to prevent large positive moderator temperature coefficients so as to insure a negative moderator temperature coefficient and to help in power shaping. Near the end of the cycle, with the reintroduction of the moderator/coolant, any remaining burnable poison gas is released into the system and taken away in the off gas system. The design is such that the removal of the moderator/coolant displacement, as well as, the release of the burnable poison gas is carried out on a slow and independently controlled basis in thereby insuring safety against accidental release or large change of reactivity during any single occurrence or transient. The system also increases an operator's flexibility in relieving unexpected power tilts during the operating cycle. This spectral shift, burnable poison, apparatus additionally alleviates the utilities concern over disposal of spent burnable poisons that are presently used to hold down excess reactivity. Further, the design of the apparatus allows for last minute power distribution adjustment. Since the poison gas can be loaded at the plant site and therefore it is possible to change the poison loading up until the time when the apparatus is placed in the core. Such flexibility greatly aids in finding acceptable loading patterns if after shutdown a utility decides not to use assemblies previously planned to be loaded. Still further, the design is such that maintenance and repair can easily be performed in the spent fuel pit. Another highly advantageous feature of the invention is that the control apparatus is reusable simply by recharging or refilling with a poison gas. This refilling operation can easily take place on-site, thus eliminating the expense of discarding the rods or the inconvenience and high costs in transporting them off-site due to their contaminated condition.

Accordingly, the present invention sets forth in a fuel assembly for a nuclear reactor including an organized array of upstanding fuel rods, a number of elongated guide thimbles strategically located within the fuel rod array, and a moderator/coolant flowing upwardly along the fuel rods, an apparatus to control the nuclear reactivity for improved fuel utilization in thereby reducing fuel cycle costs. The control apparatus includes: (a) a plurality of hollow displacer rods adapted to be inserted into respective ones of the guide thimbles for displacement of a predetermined volume of the moderator/coolant associated with the fuel rods to decrease the hydrogen/uranium ratio from a given level; (b) a manifold adapted to be disposed on the top of the fuel assembly and having a plurality of inlet ports and a plurality of exit ports connected to and in fluid flow communication with respective ones of the displacer rods and with each of the inlet ports being in fluid flow communication with at least one of the exit ports; and (c) valve means operably associated with the manifold inlet ports for selectively controlling the flow and non-flow of the moderator/coolant into the displacer rods, flow of the moderator/coolant through the inlet ports and into the displacer rods increasing the moderator/coolant volume to thereby shift the hydrogen/uranium ratio back to its given level. The invention further includes the displacer rods being filled with a burnable poison gas which is released into the moderator/coolant as it flows into the rods so as to insure a negative moderator temperature coefficient and to assist in power shaping.

More particularly, in the preferred embodiment, the manifold takes on the form of a hub defining a central opening and a plurality of hollow tube-like vanes mounted on and extending radially outwardly from the hub. The inward ends of the vanes defining the inlet ports which are circumferentially spaced about and disposed adjacent to the central opening. The valve means is selectively movable between a non-flow mode, wherein all inlet ports are closed to the flow of moderator/coolant therethrough, and a sequential flow mode, wherein some of the inlet ports are open to flow while other ones are closed to flow of the moderator/coolant therethrough. In the preferred embodiment, the valve means is in the form of an elongated hollow pipe or stem having at least one aperature or orifice, and preferably two, defined in the lower section thereof. The valve stem is rotatably mounted in the manifold with its lower orificed section being disposed in the central opening of the manifold and with its exterior wall being in abutting contact with the inlet ports so as to prevent flow of the moderator/coolant therethrough. Flow of the moderator/coolant, and the release of the burnable poison gas simultaneously therewith, through the inlet ports only occurs when the orifices are aligned with the inlet ports which is accomplished through rotation of the valve stem.

These and other advantages and attainments of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
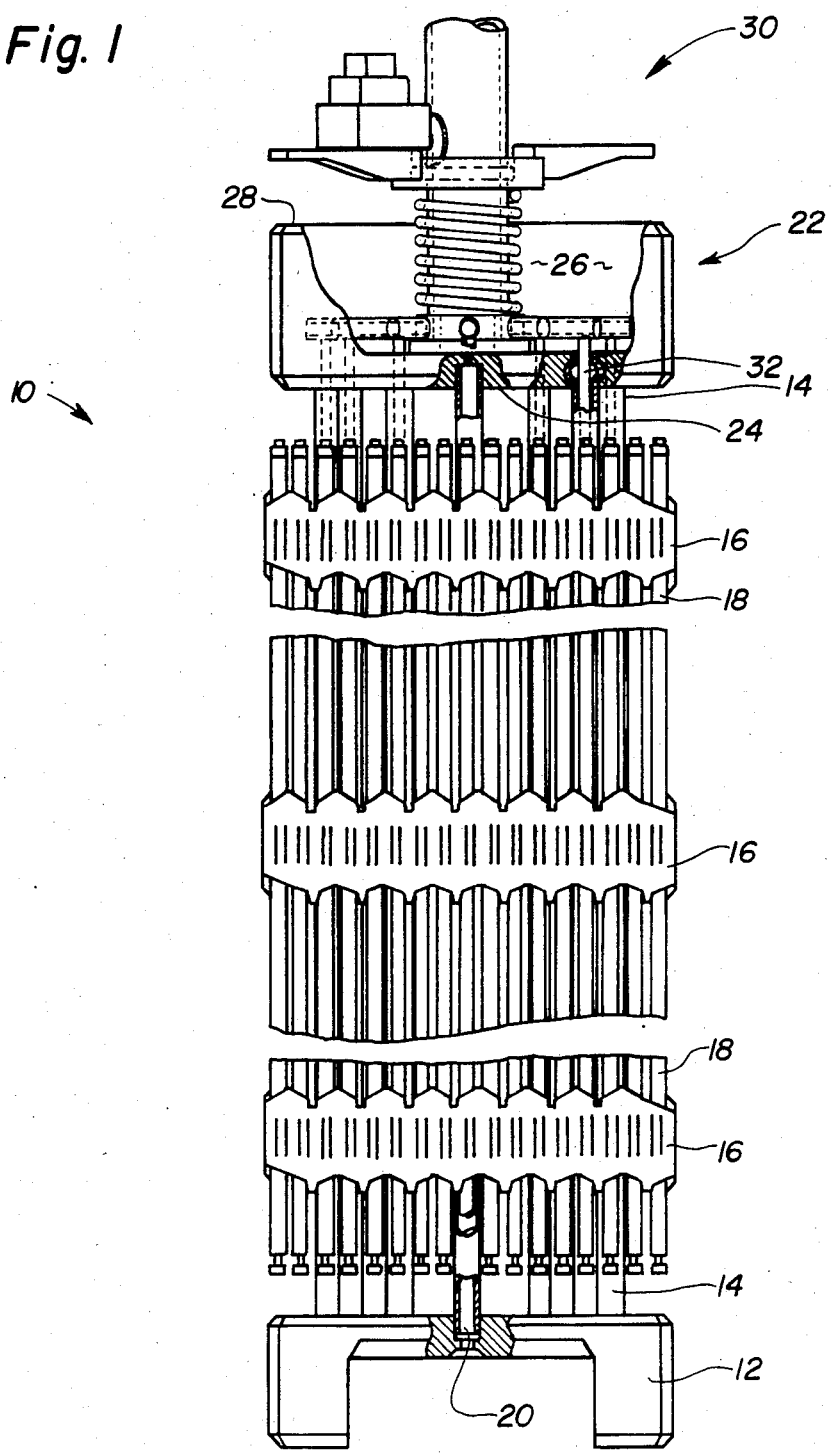
FIG. 1 is an elevational view of a conventional fuel assembly with the moderator control apparatus of the present invention disposed in its operative mode, being supported on the top of the fuel assembly and with its displacer rods being inserted in the guide thimbles of the fuel assembly. The fuel assembly is shown in a vertically foreshortened form with a portion of its top nozzle being broken away to more clearly show the moderator control apparatus.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a conventional fuel assembly, represented in vertically foreshortened form and being generally designated by the numeral 10. Fuel assembly 10 is the type used in a PWR (Pressurized Water Reactor) and basically comprises a lower end structure or bottom nozzle 12 for supporting the assembly on the lower core plate (not shown) in the core region of a reactor (not shown); a number of longitudinally extending guide tubes or thimbles 14 projecting upwardly from the bottom nozzle 12; a plurality of transverse grids 16 axially spaced along the guide thimbles 14; an organized array of elongated fuel rods 18 transversely spaced and supported by the grids 16; an instrumentation tube 20 located in the center of the assembly; and an upper end structure or top nozzle, generally designated by the numeral 22, attached to the upper ends of the guide thimbles 14 to form an integral assembly capable of being conventionally handled without damaging the assembly components.

The top nozzle 22 includes a transversely extending adapter plate 24 having upstanding sidewalls 26 (the front wall being partially broken away) secured to the perpherial edges thereof in defining an enclosure or housing. An annular flange 28 is secured to the top of the sidewalls 26. Suitably clamped to the annular flange 28 are leaf springs (not shown) which cooperate with the upper core plate (not shown) in a conventional manner to prevent hydraulic lifting of the fuel assembly caused by upward coolant flow, while allowing for changes in fuel assembly length due to core induced thermal expansion and the like. Disposed within the opening defined by the annular flange 28 is the moderator control apparatus of the present invention, being designated generally by the numeral 30, which will be described in detail shortly hereafter. In that fuel assembly 10 does not form a part of the present invention, but is merely for illustrational purposes in representing the operative environment for use of the moderator control apparatus 30, a further description thereof will not be given. For a more detailed description of fuel assembly 10, reference should be made to the pending patent application of John M. Shallenberger et al, entitled "Nuclear Reactor Fuel Assembly With A Removable Top Nozzle"; filed Aug. 27, 1984; and assigned U.S. Ser. No. 644,758, a continuation-in-part of Ser. No. 537,775, filed Sept. 30, 1983 and now abandoned.

MODERATOR CONTROL APPARATUS

Figure 2:
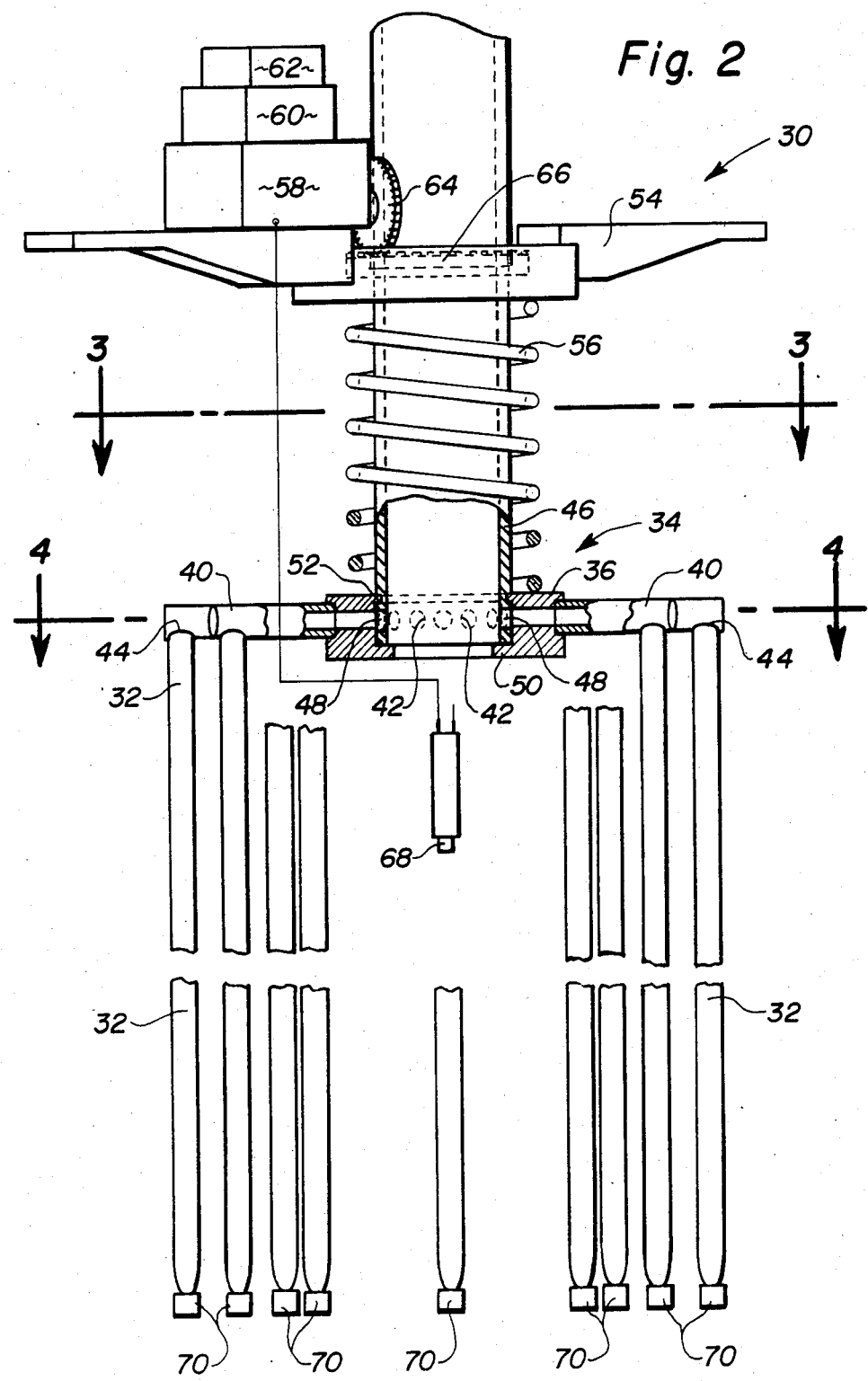
FIG. 2 is an enlarged, partially sectioned, elevational view of the moderator control apparatus being removed from the fuel assembly of FIG. 1.
Figure 3:
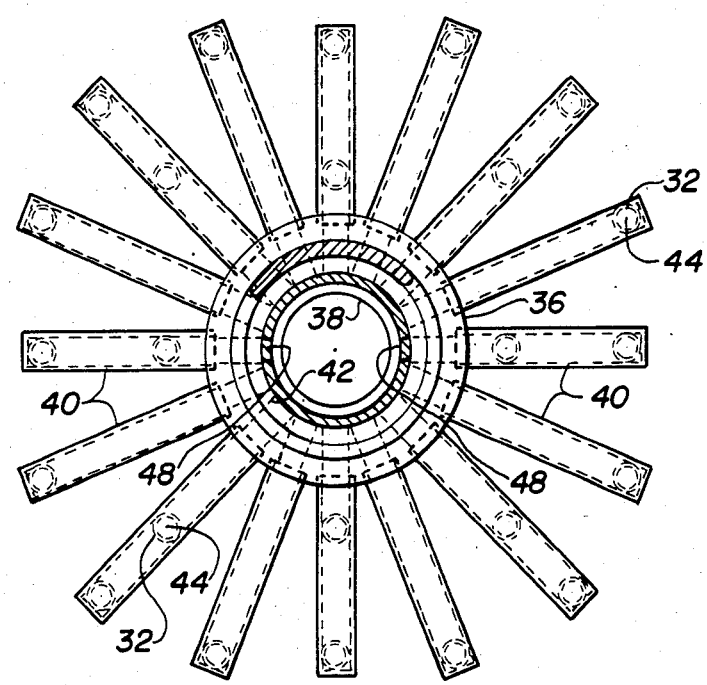
FIG. 3 is a sectional view of the moderator control apparatus as taken along line 3—3 of FIG. 2.
Figure 4:
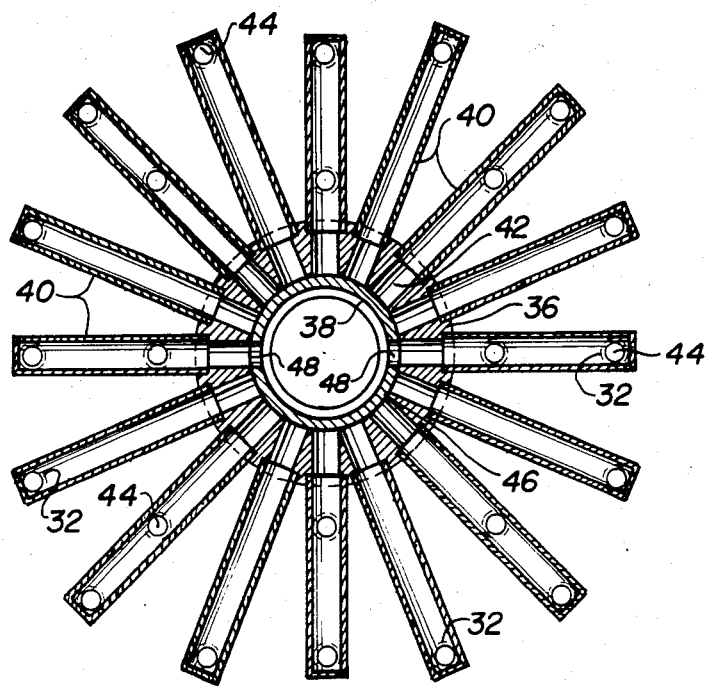
FIG. 4 is a sectional view of the moderator control apparatus as taken along line 4—4 of FIG. 2.

The moderator control apparatus 30 will now be discussed in further detail with particular reference to FIGS. 2, 3, and 4. As best seen in FIG. 2, the apparatus 30 includes a plurality of hollow elongated displacer rods 32 adapted to be inserted into respective ones of the guide thimbles 14 of the fuel assembly 10 for displacement of a predetermined volume of the moderator/coolant associated with the fuel rods 18. The displaced volume of the moderator/coolant decreases the H/U (hydrogen/uranium) ratio from a given normal level. The displacer rods 32 are interconnected by a manifold, generally designated by the numeral 34, located on the top of fuel assembly 10 and being disposed within the top nozzle and resting on the adapter plate 24 (see FIG. 1). In the preferred embodiment, the manifold 34 is in the form of a central hub 36 defining a central opening 38 (see FIGS. 3 and 4) and includes a plurality of, radially extending, hollow tube-like vanes 40 interconnecting the upper ends of the displacer rods 32 to the central hub 36. The hub 36 is provided with a number of radial bores or inlet ports 42 corresponding to the number of vanes 40. The inward end of the vanes are suitably secured to the hub such that the inlet ports 42 serve as unitary channel extensions of the vanes (best seen in FIG. 2), the arrangement being such that the inlet ports are circumferentially spaced about and adjacent the central opening 38 defined by the hub 36 (see FIGS. 3 and 4). It is preferred that each inlet port be disposed diametrically opposite another inlet port (the purpose for which being clearly understood from below). Each of the vanes 40 have at least one exit port 44 defined therein, some of the vanes have one such exit port whereas adjacent vanes have two exit ports. The number of exit ports 44 corresponds to the number and strategic location of the displacer rods 32. Although not specifically shown, it is preferred that the rods be threadably connected with the vanes 40 to facilitate assembly and dismantling, however, other suitable connections could equally be used. As can be appreciated, the connections are such that the inlet ports 42 are in fluid flow communication with the exit ports 44 of a respective vane 40, whereas, the exit ports 44 are in fluid flow communication with the respective displacer rods 32. Before continuing, it should be pointed out that the specific above-described manifold structure with its central hub and radially extending vanes is only illustrative of one possible type configuration and construction used, it being understood that other smaller structures and arrangements are equally applicale in keeping within the principles of the present invention.

Again referring to FIG. 2, the control apparatus 30 further includes valves means operably associated with the manifold inlet ports 42 for controlling the flow and non-flow of the coolant into the displacer rods 32. More particularly, when the inlet ports are in closed position the flow of coolant therethrough is prohibited, whereas, in an opened position, coolant flows through the inlet ports 42, along through the vanes 40, and then out through the exit ports 44 and into the displacer rods 32. Thus, by opening the inlet ports, the original displacement of the coolant is removed as the rods are filled with coolant in thereby increasing or returning the H/U ratio back to its normal given level (shifting of the energy spectrum). In the preferred embodiment, the valve means takes on the form of a rotatable hollow stem 46 which is operable to open and close all of the inlet ports 42 in a predetermined sequential manner, however, as can be appreciated, a separate valve may be associated with each of the inlet ports. The valve stem 46 is circular with its lower section being provided with at least one, and preferably two diametrically opposite, flow aperatures or orifices 48. Still referring to FIG. 2, the valve stem 46 is mounted such that the lower end of the stem rests on an integral annular lip 50 of hub 36, whereas, a circumferential groove, on the stem at an axial location above the orifices 48, engages an annular flange 52, integrally formed on the hub 36 above the lower lip 50. The mounting arrangement permits rotation of the stem on the manifold, and more specifically, the rotation of the lower section of the stem 46 within the central opening 38. The dimension of the lower section of stem 46 is such that its exterior wall surface snugly abuts the inlet ports 42 and manifold 34 in sealing off the inlet ports so as to prevent the flow of coolant therethrough. Flow of coolant through the inlet ports 42, and thus into the displacer rods 32, only occurs when the valve stem 46 has been rotated to a point such that the orifices 48 are aligned with the inlet ports 42, as illustrated in FIG. 4. The valving is such that only two inlet ports (and the maximum of four displacer rods) are open to the flow of coolant therethrough at any one time, thereby insuring safety against accidental release or large change of reactivity during any single occurrence or transient. Further, such valving system provides an operator with increased flexibility to relieve unexpected power tilts during an operating cycle.

Slidably mounted on the valve stem 48 is a perforated hold down plate 54 which compresses spring 56 as the upper core plate (not shown) is lowered down unto the assembly. Spring 56 is coiled about the valve stem 46 and is interposed between the hold down plate 54 and the central hub 36. This conventional arrangement prevents the control apparatus 30 from being ejected off the fuel assembly 10 by the forces of the upwardly flowing coolant. As best seen in FIG. 2, supported on plate 54 is a motor 58, battery 60, and transmitter/receiver 62 which diagramatically represent conventional means for rotating the valve stem 46 to cause the inlet ports 42 to open and close as described above. The motor 58 drives sprocket 64 which meshes with circular ring gear 66 that is attached to valve stem 46. From an external location, an operator sends a signal (electromagnetic, radio, or microwave) to the transmitter/receiver 60 which in turn actuates the motor 58, causing the valve stem to rotate. In the alternative, the motor 58 can be actuated by an incore buttom 68 which is accessible via the instrumentation tube 20 that is located within the center of fuel assembly 10.

In that the displacement of the coolant in the guide thimbles 14 may not be sufficient to insure a negative moderator temperature coefficient and that selective displacement of the coolant may be insufficient for power shaping control, the invention further contemplates the use of a burnable poison. More specifically, each of the displacer rods 32 are filled with a burnable poison gas, preferably the gas is He$^3$. The gas is released as the inlet ports 42 are opened to permit the flow of the coolant into the displacer rods 32. Due to the specific valving arrangement discussed above, the gas can only be released from two inlet ports (maximum of four displacer rods) at any one time, thus alleviating many safety problems.

In order that the control apparatus 30 may be reused after completion of a cycle, in the preferred embodiment, each of the displacer rods 32 are provided with a refill valve 70, located at the lower end of the rod. In addition to the inherent cost savings in being able to reuse the rods 32 rather than discarding them, the refill valves 70 provide for last minute power distribution adjustment. Since the rods can be refilled on-site, the specific poison loading can be delayed until the time when the apparatus is placed on a fuel assembly.

It is thought that the moderator control apparatus of the present invention and many of its attendant advantages will be understood from the foregoing description and it will be apparent that various changes may be made in form, construction and arrangement thereof without departing from the spirit and scope of the invention or sacrificing all of its material advantages, the form hereinbefore being merely a preferred or exemplary embodiment thereof.

We claim:

1. In combination with a fuel assembly for a nuclear reactor including an organized array of upstanding fuel rods, a number of elongated guide thimbles strategically located within the fuel rod array, and a moderator/coolant flowing upwardly along the fuel rods to above said fuel assembly, an apparatus to control the nuclear reactivity for improving fuel utilization and thereby reducing fuel cycle costs, said control apparatus comprising:
    (a) a plurality of hollow displacer rods inserted into respective ones of said guide thimbles, displacing a predetermined volume of said moderator/coolant associated with said fuel rods to decrease the hydrogen/uranium ratio from a given level;
    (b) a manifold disposed on the top of said fuel assembly in fluid flow communication with said moderator/coolant and having a plurality of inlet ports and a plurality of exit ports connected to and in fluid flow communication with respective ones of said displacer rods, each inlet port being in fluid flow communication with at least one of said exit ports; and
    (c) valve means operably associated with said manifold inlet ports for controlling the flow and non-flow of said moderator/coolant through said inlet ports and into said displacer rods via said exit ports of said manifold, said flow of said moderator/coolant through said inlet ports and into said displacer rods increasing the moderator/coolant volume in thereby shifting the hydrogen/uranium ratio back to its given level.

2. The control apparatus as defined in claim 1, wherein in said flow mode no more than two of said inlet ports are open to the flow of moderator/coolant therethrough at any one time.

3. The control apparatus as defined in claim 1, wherein said displacer rods are filled with a burnable poison gas, said gas being released into said moderator/coolant to control the reactivity simultaniously as said moderator/coolant flows into said displacer rods.

4. The control apparatus as defined in claim 3, wherein said burnable poision gas is He$^3$.

5. The control apparatus as defined in claim 3, wherein each of said displacer rods includes a valve located at the lower end thereof for refilling said rod with a burnable poison gas after completion of a fuel cycle.

6. The control apparatus as defined in claim 12, wherein said lower section of said valve stem includes two orifices, one orifice being disposed diametrically opposite the other orifice.

7. The control apparatus as defined in claim 12, wherein said manifold includes a central hub which defines said central opening and a plurality of hollow tube-like vanes mounted on and extending radially outwardly from said hub, the inward end of said vanes defining said inlet ports whereas the outward end of said vanes defining at least some of said exit ports.

8. The control apparatus as defined in claim 7, wherein some of said vanes include at least two exit ports, said vanes having two exit ports being alternately arranged with said tubes having one exit port.

9. The control apparatus as defined in claim 7, wherein said vanes are circumferentially spaced about said hub and arranged such that one inlet port is diametrically opposite another inlet port.

10. The control apparatus as defined in claim 14, further including means for rotating said valve stem about the axis of said central opening for selective movement between said flow and non-flow modes.

11. In combination with a fuel assembly for a nuclear reactor including an organized array of upstanding fuel rods, a number of elongated guide thimbles strategically located within the fuel rod array, and a moderator/coolant flowing upwardly along the fuel rods to above said fuel assembly, an apparatus to control the nuclear reactivity for improving fuel utilization and thereby reducing fuel cycle costs, said control apparatus comprising:
 (a) a plurality of hollow displacer rods inserted into respective ones of said guide thimbles, displacing a predetermined volume of said moderator/coolant associated with said fuel rods to decrease the hydrogen/uranium ratio from a given level;
 (b) a manifold disposed on the top of said fuel assembly in fluid flow communication with said moderator/coolant and having a plurality of inlet ports and a plurality of exit ports connected to and in fluid flow communication with respective ones of said displacer rods, each inlet port being in fluid flow communication with at least one of said exit ports; and
 (c) valve means operably associated with said manifold inlet ports for controlling the flow and non-flow of said moderator/coolant through said inlet ports and into said displacer rods via said exit ports of said manifold, said flow of said moderator/coolant through said inlet ports and into said displacer rods increasing the moderator/coolant volume in thereby shifting the hydrogen/uranium ratio back to its given level;
 (d) said valve means being selectively movable relative to said inlet ports between a non-flow mode, wherein all of said inlet ports are closed to the flow of said moderator/coolant therethrough, and a sequential flow mode, wherein some of said inlet ports are open to flow while other ones of said inlet ports are closed to the flow of said moderator/coolant therethrough.

12. In combination with a fuel assembly for a nuclear reactor including an organized array of upstanding fuel rods, a number of elongated guide thimbles strategically located within the fuel rod array, and a moderator/coolant flowing upwardly along the fuel rods to above said fuel assembly, an apparatus to control the nuclear reactivity for improving fuel utilization and thereby reducing fuel cycle costs, said control apparatus comprising:
 (a) a plurality of hollow displacer rods inserted into respective ones of said guide thimbles, displacing a predetermined volume of said moderator/coolant associated with said fuel rods to decrease the hydrogen/uranium ratio for a given level;
 (b) a manifold disposed on the top of said fuel assembly and having a central opening disposed in fluid flow communication with said moderator/coolant, a plurality of inlet ports defined in said manifold in circumferentially spaced relation about and adjacent to said central opening and a plurality of exit ports connected to and in fluid flow communication with respective ones of said displacer rods, said each inlet port being in fluid flow communication with at least one of said exit ports; and
 (c) valve means operably associated with said manifold for controlling the flow and non-flow of said moderator/coolant through said inlet ports and into said displacer rods via said exit ports of said manifold, said flow of said moderator/coolant through said inlet ports and into said displacer rods increasing the moderator/coolant volume in thereby shifting the hydrogen/uranium ratio back to its given level, said valve means including an elongated hollow valve stem rotatably disposed in said central opening of said manifold and having at least one orifice defined in a lower section thereof such that said stem abuts said inlet ports to prohibit flow of said moderator/coolant therethrough when said orifice is not in alignment with a respective one inlet port and to permit flow of said moderator/coolant therethrough and into said displacer rod in fluid flow communication with said one inlet port when said orifice is in alignment therewith.

* * * * *